UNITED STATES PATENT OFFICE.

PROSPER DE WILDE AND ALBERT REYCHLER, OF BRUSSELS, BELGIUM.

PROCESS OF MAKING CHLORINE.

SPECIFICATION forming part of Letters Patent No. 463,767, dated November 24, 1891.

Application filed May 6, 1890. Serial No. 350,787. (No specimens.) Patented in Belgium October 22, 1889, No. 88,162, November 4, 1889, No. 88,302, and February 14, 1890, No. 89,518; in Germany October 26, 1889, No. 53,749; in England October 31, 1889, No. 17,272, and in France November 18, 1889, No. 202,006.

*To all whom it may concern:*

Be it known that we, PROSPER DE WILDE and ALBERT REYCHLER, of Brussels, in the Kingdom of Belgium, have invented a Process for the Production of Chlorine, (for which we have obtained Letters Patent in Belgium October 22, 1889, No. 88,162; in Germany October 26, 1889, No. 53,749; in Belgium, addition, November 4, 1889, No. 88,302; in England October 31, 1889, No. 17,272; in France November 18, 1889, No. 202,006; and in Belgium, addition, February 14, 1890, No. 89,518,) of which the following is a specification.

In carrying out our invention we first take the mixture obtained by calcining at a dull red heat in a muffle-furnace equivalent quantities of sulphate of magnesium, chloride of magnesium, and chloride of manganese, all three being hydrated. The proportions used may vary within certain limits. The calcined matter is formed by an intimate mixture of anhydrous sulphate of magnesium and of manganite of magnesium, $(Mn_3Mg_3O_8.)$ This mixture disengages chlorine when treated with liquid hydrochloric acid. This mixture, which is coherent and porous, is placed in fragments in a cylinder of earthenware inclosed in an iron casing and is heated to a temperature a little below red heat. A current of hydrochloric-acid gas is passed through and a rich current of chlorine is given off according to the equation:

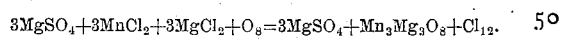

The chlorine thus obtained necessarily contains a good deal of water and an excess of hydrochloric acid. In order to utilize it, it has to be deprived of these two bodies, which is effected by well-known processes. After the action of the hydrochloric acid (which it is not necessary to carry quite to the end) there remains in the cylinders a mixture of anhydrous sulphate of magnesium, chloride of magnesium, and chloride of manganese. If there is directed upon the mixture a current of dry air heated to a dull red heat, chlorine is disengaged and the mixture of sulphate of magnesium and manganite of magnesium is reconstituted.

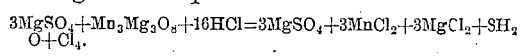

The gases passing from the apparatus contain from sixteen to twenty-seven volumes per cent. of chlorine, and can be employed in known ways for the production of chlorates and hypochlorites. After the action of the air the mixture of sulphate of magnesium and manganite of magnesium is again acted upon by gaseous hydrochloric acid, whereby the above-mentioned action is produced. The mixture is then again acted upon with heated dry air, and so on, the operations being continuously repeated in the same apparatus at a dull or very dull red heat. There may also be passed through the cylinder a mixture of air and hydrochloric acid, such as passes from the sulphate furnaces. Our mixture remains consistent and the reaction gives a continuous current of chlorine mixed with nitrogen, oxygen, steam, and an excess of hydrochloric acid. Before use it is deprived of these two bodies by well-known means.

We claim as our invention—

The mode herein described of producing chlorine by first treating with hydrochloric-acid gas a mixture of sulphate of magnesium and manganite of magnesia, and, secondly, treating with heated air the thus-obtained mixture of sulphate of magnesium, chloride of magnesium, and chloride of manganese, all substantially as set forth.

In testimony whereof we have signed our names to this specification in the presence of two subscribing witnesses.

PROSPER DE WILDE.
    ALBERT REYCHLER.

Witnesses:
 EMILE NUYTS,
 GUSTAVE PIERRY.